(12) United States Patent
Bessette

(10) Patent No.: US 6,837,359 B1
(45) Date of Patent: Jan. 4, 2005

(54) PUSH OFF DIVERTER FOR SORTATION SYSTEMS

(76) Inventor: Dean E. Bessette, 16435 Harbour La., Huntington Beach, CA (US) 92649

( * ) Notice: Subject to any disclaimer, the term of this patent is extended or adjusted under 35 U.S.C. 154(b) by 23 days.

(21) Appl. No.: 10/781,153

(22) Filed: Feb. 17, 2004

(51) Int. Cl.$^7$ .............................................. B65G 47/10
(52) U.S. Cl. ............................ 198/370.07; 198/457.07; 198/598
(58) Field of Search ....................... 198/370.07, 370.08, 198/598, 468.9, 457.07

(56) References Cited

U.S. PATENT DOCUMENTS

| | | | | |
|---|---|---|---|---|
| 1,636,429 A | * | 7/1927 | Olson ....................... | 198/463.2 |
| 5,010,998 A | * | 4/1991 | MacMillan ............ | 198/370.07 |
| 5,464,088 A | * | 11/1995 | Koerber ................ | 198/370.07 |
| 5,887,699 A | * | 3/1999 | Tharpe ....................... | 198/367 |
| 6,068,105 A | * | 5/2000 | Darwish et al. ........ | 198/370.02 |
| 6,220,421 B1 | * | 4/2001 | Hugon et al. ........... | 198/370.07 |
| 6,220,422 B1 | * | 4/2001 | Lee ......................... | 198/370.07 |
| 6,581,749 B2 | * | 6/2003 | Wood et al. ............ | 198/370.09 |
| 6,588,575 B1 | * | 7/2003 | Heuft et al. ............ | 198/370.07 |

* cited by examiner

Primary Examiner—Douglas Hess

(57) ABSTRACT

The push off diverter may be used to push objects off of a conveyor. The push off diverter may have a frame having a slide support element with a push bar attached. An electric gearmotor may be attached to the diverter frame and the output motor shaft may have a lever arm attached. A push rod may have a ball end element at each end. A first end of the push rod may be attached at the approximate outer end of the lever arm and a second end may be attached to a bracket that may be attached to the push bar. There may be a control unit that may apply electric power to rotate the electric gearmotor, to activate a brake for the electric gearmotor, and to terminate power for rotation of the electric gearmotor.

9 Claims, 1 Drawing Sheet

PUSH OFF DIVERTER FOR SORTATION SYSTEMS

BACKGROUND OF THE INVENTION

This invention relates to devices used to divert mail containers, packages or other items moving in a direction on a conveyor to be pushed off of the conveyor. The containers may then move on to another conveyor, or enter a bin or other stop location. The new push off diverter may use an electric gearmotor structured to rotate a shaft having a lever arm and push rod to move a push plate across a conveyor to push a designated object or container off the conveyor.

Push off diverters may be currently used in various commercial and government conveyor systems. For example, the U.S. Post Office may use a pneumatic push off diverter to sort mail containers in a sortation system. These systems may use compressed air systems or other fluid systems that may be a safety concern due to the danger of terrorists. For example, pressurized air may spread uncontained biological or toxic powder material in a work environment.

SUMMARY OF THE INVENTION

The present invention is directed to apparatus that may be used to push objects off of a conveyor. The push off diverter may have a frame having a slide support element with a push bar attached. An electric gearmotor may be attached to the diverter frame and a motor shaft may have a lever arm attached. A push rod may have a ball end element at each end. A first end of the push rod may be attached at the approximate outer end of the lever arm and a second end may be attached to a bracket that may be centrally attached to the push bar. There may be a control unit that may apply electric power to rotate the electric gearmotor, to activate a brake for the electric motor, and to terminate power for rotation of the electric gearmotor.

These and other features, aspects and advantages of the present invention will become better understood with reference to the following drawings, description and claims.

DETAILED DESCRIPTION

The following detailed description represents the best currently contemplated modes for carrying out the invention. The description is not to be taken in a limiting sense, but is made merely for the purpose of illustrating the general principles of the invention.

Figure 1:
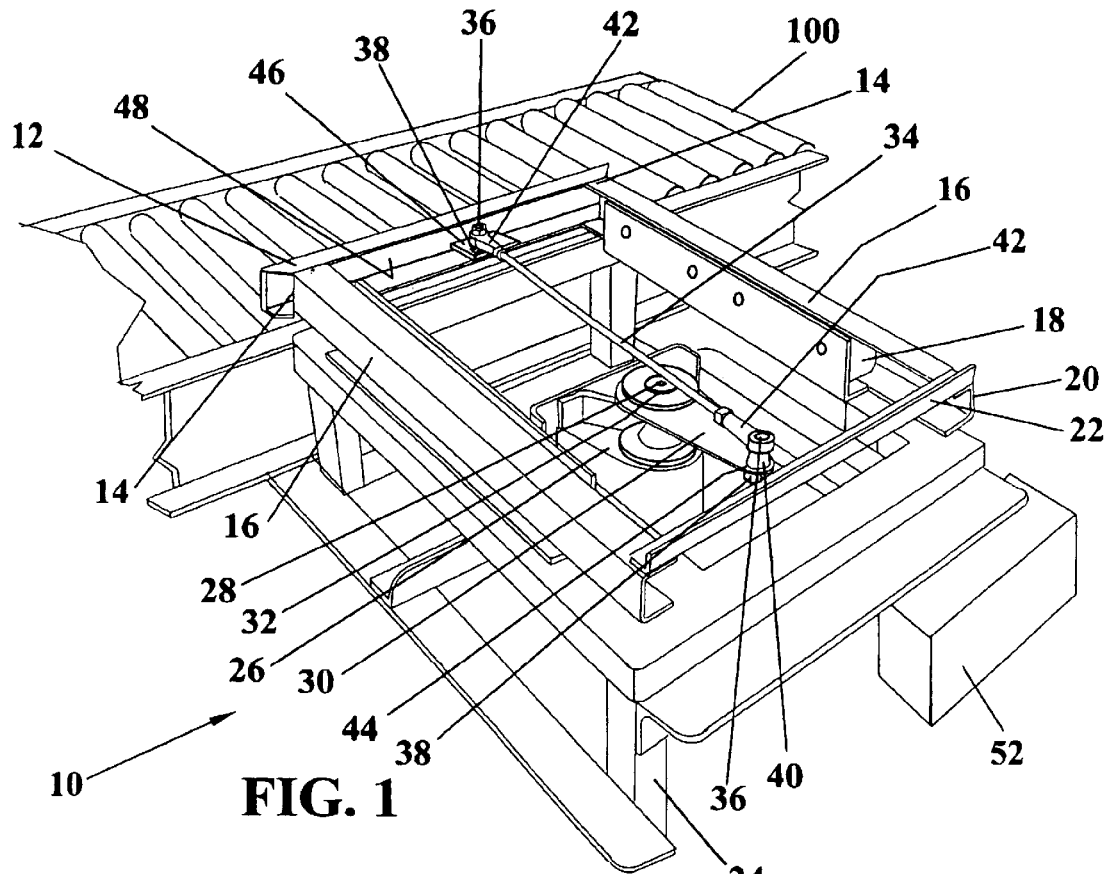
FIG. 1 illustrates a perspective view of a push off diverter according to an embodiment of the invention.
Figure 2:
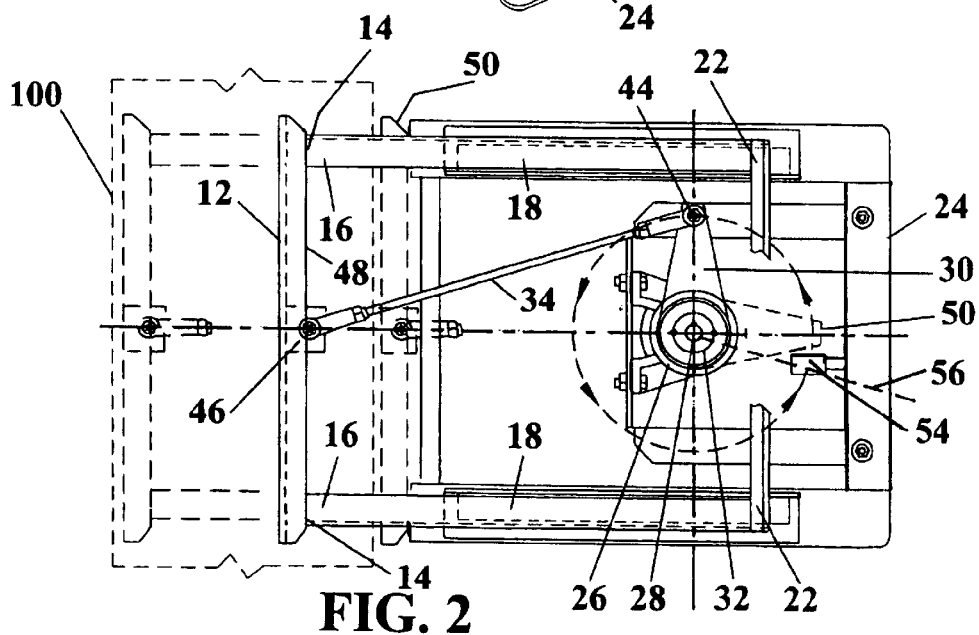
FIG. 2 illustrates a top plan view of a push off diverter according to an embodiment of the invention.

Referring to FIGS. 1 and 2, a push off diverter 10 may be positioned adjacent a conveyor 100. The diverter 10 may have a push bar 12 or plate that may be moved approximately perpendicularly across the conveyor 100 to force objects, as for example a mail container, off of the conveyor 100.

The push bar 12 may be attached at the ends 14 of a slide support element such as two rails 16 that may be slidably mounted on guide bearings 18. The rails 16 may be attached at a rearward end 20 by a cross bar 22. The bearings 18 may be attached to a diverter frame 24. While a C-shape rail 16 may be illustrated, other slide support structures may be used, for example, a pair of rods slidably inserted in linear bearings attached to the diverter frame 24 may be used to guide the push bar 12 in the to and from motion.

The frame 24 may have an electric gearmotor 26 attached wherein the gearmotor shaft 28 may be generally vertically oriented and may have a lever arm 30 attached thereto. There may also be a locking hub 32 attached to the shaft 28.

The lever arm 30 may have a push rod 34 rotatably attached by a bolt 36 and nut 38 or other attachment device. There may be a bushing 40, washer or the like between the lever arm 30 and push rod 34. The push rod 34 may have a ball end element 42, ball bearing, roller bearing or the like at each end for rotatable attachment by a bolt 36. The push rod 34 may be attached at the approximate outer end 44 of the lever arm 30 and at a bracket 46 attached to the rear side 48 of the push bar 12. As may be best seen in FIG. 2, this attachment configuration may allow a reciprocating motion wherein one rotation of the motor shaft 28 may cause the push bar 12 to move across a conveyor 100 a sufficient distance to push an object off of the conveyor 100 and then return to a stop position 50.

To allow for rapid movement of the push bar 12 across the conveyor 100, an electric gearmotor 26 may be used that provides rapid start up rotation and that may have a brake for deceleration and stopping. A control unit 52 may have circuitry for application of electric power with overload circuit protection. There may be a sensor 54 positioned to sense the lever arm 30 when it is approaching a stop position 50 relative to the stop position 50 of the push bar 12. This may bring the push bar 12 to a decelerated rest in a position withdrawn from the path of objects on the conveyor 100. While the drawings illustrate the gearmotor 26 with the motor shaft 28 in an approximately vertical orientation, other orientations such as horizontal may be used.

The sensor 54 may be positioned approximately 35 degrees before the stop point 50 of the lever arm 30 along rotational line 56 as illustrated in FIG. 2. The sensing of the lever arm 30 may initiate circuitry in control unit 52 to cause the lever arm 30 to stop at the stop position 50 in a manner to reduce stress on the electric gearmotor 26 apparatus and other elements of the system. The sensor 54 may be a photo cell detector or other suitable object detector that does not interfere in the operation of the lever, for example, a shaft rotation position detector may be used.

In compliance with prevailing safety regulations, appropriate guard covers may be provided to prevent accidental human contact with the internal moving parts of the push off diverter while in operation.

While the invention has been particularly shown and described with respect to the illustrated embodiments thereof, it will be understood by those skilled in the art that the foregoing and other changes in form and details may be made therein without departing from the spirit and scope of the invention.

I claim:

1. An apparatus to push objects off of a conveyor comprising:

a diverter frame having a slide support element with a push bar attached;

an electric gearmotor attached to said diverter frame;

an output motor shaft of said electric gearmotor having a lever arm attached;

a push rod having a ball end element at each end rotationally attached at a first end to the approximate outer end of said lever arm and at a second end to a bracket that is attached to said push bar;

a control unit for application of electric power to rotate said electric gearmotor, to activate a brake of said motor and to terminate power for rotation.

2. The apparatus as in claim 1 wherein said slide support element comprising:

a pair of rails having said push bar attached at a first end of each rail and a cross bar attached at a second end of each rail; and a plurality of guide bearings attached to said diverter frame positioned for said rails to linearly slide on said guide bearings in to and from motion relative to said diverter frame.

3. The apparatus as in claim 1 wherein said output motor shaft is approximately vertically oriented relative to a horizontal plane of motion of said push bar.

4. The apparatus as in claim 1 wherein a locking hub is attached to said output motor shaft.

5. The apparatus as in claim 1 wherein said push rod is rotationally attached at said first end to said approximate outer end of said lever arm with a bushing intermediate said first end and said lever arm.

6. The apparatus as in claim 1 wherein said bracket is attached at a rear side of said push bar and at an approximate longitudinal center of said push bar.

7. The apparatus as in claim 1 further comprising:

a sensor attached to said diverter frame positioned to sense the presence of said lever arm;

said control unit in communication with said sensor to terminate electric power for rotation of said electric motor and to apply a brake biased for engagement when said electric power is terminated.

8. The apparatus as in claim 7 wherein said sensor is positioned offset approximately 35 degrees from a center line between said motor shaft and said bracket.

9. The apparatus as in claim 7 wherein said brake retards and stops rotation of said lever arm to position said push bar at a stop position.

* * * * *